Patented Dec. 22, 1931

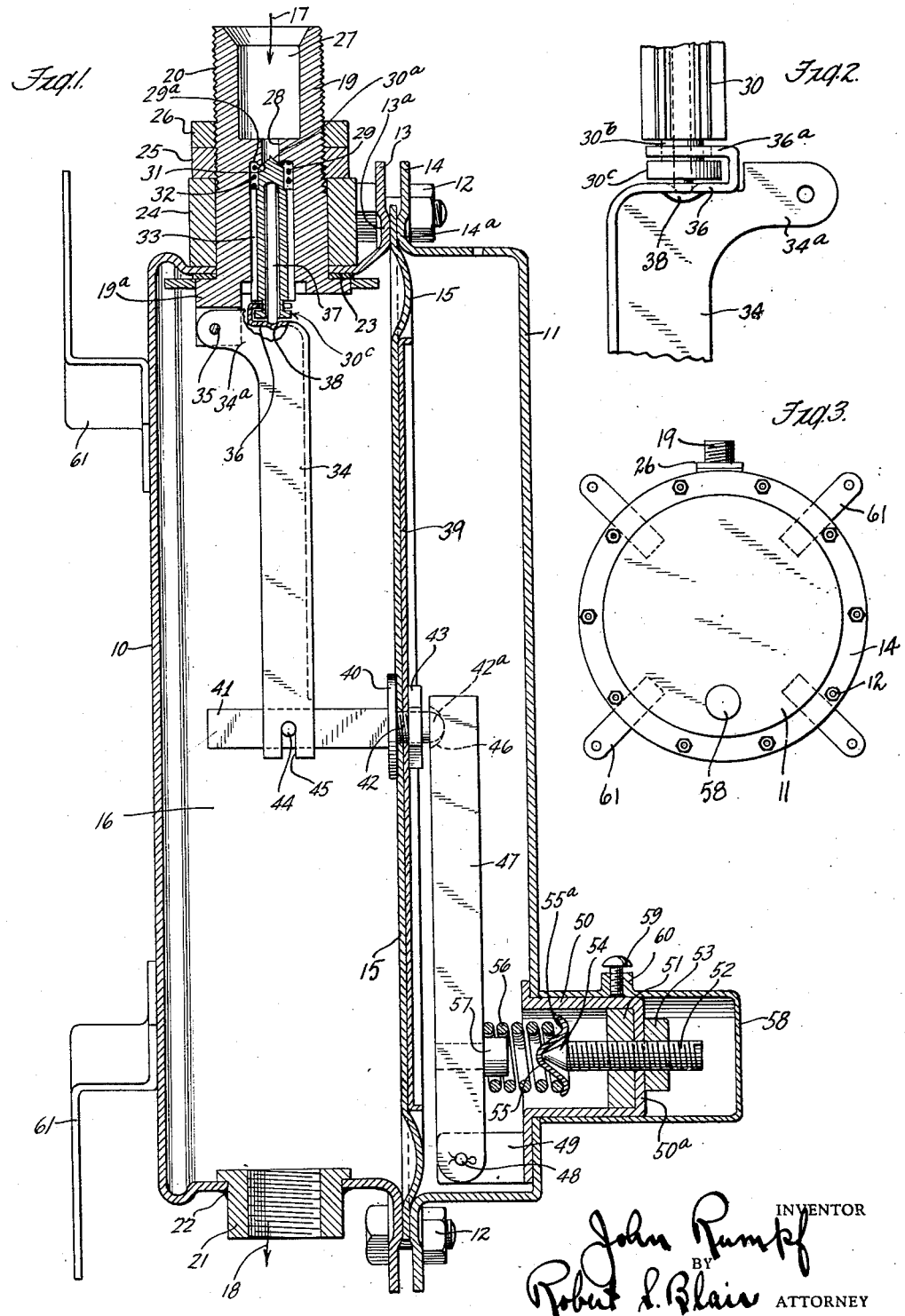

1,837,233

UNITED STATES PATENT OFFICE

JOHN RUMPF, OF NEW MILFORD BOROUGH, NEW JERSEY, ASSIGNOR TO THE SAFETY CAR HEATING & LIGHTING COMPANY, A CORPORATION OF NEW JERSEY

REGULATOR

Application filed September 15, 1927. Serial No. 219,648.

This invention relates to the construction of pressure regulators and the like. One of the objects thereof is to provide a device of the above nature which is of simple construction and well adapted to meet the requirements of hard practical use. Another object is to provide a device of the above nature which is capable of a high degree of accuracy in operation. Another object is to provide a device of the above nature which is inexpensive. Another object is to provide a device of the above nature having few parts and convenient to adjust or to take apart for cleaning or other purposes. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which is shown one of the various possible embodiments of this invention, Figure 1 is a transverse sectional view;

Figure 2 is a side elevation of a portion of the valve and its connections, the parts being viewed from the side opposite to that seen in Figure 1; and Figure 3 is an elevation on a smaller scale.

Similar reference characters refer to similar parts in all views of the drawings.

Referring now to the drawings in detail, there is shown a casing comprising two portions 10 and 11 which are clamped together by means of bolts 12. The casing portion 10 has a peripheral flange 13 and the casing portion 11 has a similar flange 14, these two flanges being clamped together by the bolts 12 which pass therethrough. Extending through the casing is a flexible diaphragm 15 of leather or fabric or the like, the edge of which is tightly clamped between the portions 13a and 14a of the two flanges 13 and 14.

The diaphragm 15, with the casing portion 10, forms a fluid chamber 16 to which fluid is admitted as indicated by the arrow 17 and from which the fluid is drawn as indicated by the arrow 18. The entering passage for the fluid is through a member 19 in which is positioned a valve for controlling the flow of the fluid into the chamber. The outer end of the member 19 is exteriorly threaded as shown at 20 for the reception of a suitable pipe connection from a source of fluid under pressure. The exit passage for the fluid from the chamber 16 is through a bushing 21 which is interiorly threaded, for example, to receive a pipe for leading the fluid away. The casing member 10 is formed of sheet metal and the bushing 21 is secured in an opening therein by means of solder or welding 22.

The member 19 through which the fluid is admitted to the pressure chamber is of elongated form and has at its inner end, within the chamber, a flange 19a between which and the wall of the casing is inserted a packing washer 23. About the member exterior of the casing is positioned a sleeve 24 and, threaded upon the member 19 and bearing against the outer end of the sleeve 24, is a nut 25 and preferably also a locking nut 26. The nut 25, threaded against the end of the sleeve 24, effects a secure clamping of the packing 23 so as to form a fluid-tight joint, and also secures the member 19 in position. By removing the nuts 25 and 26 the member 19 may be removed by drawing it inwardly toward the interior of the casing.

The outer end portion of the member 19 is provided with a fluid passage 27 and, leading inwardly from the passage 27 is a smaller passage 28. At the inner end of the small or restricted passage 28 is a larger passage 29 which extends to the inner end of the member 19 and in which is positioned a valve 30. The valve member 30 has a tapered end 30a for which the edge 31 at the inner end of the restricted passage 28 forms a seat. The valve 30 thus controls the flow of fluid through the passage 28 and hence into the pressure chamber 16.

The valve member 30 comprises an elongated member which has a sliding fit in the passage 29. Adjacent the pointed end 30a the valve member is reduced in diameter and, inserted in the space thus provided, is a spiral spring 32 which acts between the body of the valve member and the surface at the outer end of the passage 29a about the inner end of the passage 28. The surface 29a is preferably concave as shown to form a seat for the spring and avoid any possibility of the spring interfering with the proper cooperation between the valve and its seat. The body of the valve member 30 is provided in its surface with a plurality of longitudinally extending grooves 33, or its surface is ribbed, permitting flow through the passage 29 and into the chamber 16 of fluid admitted between the valve end and the valve seat.

At the inner end of the member 19 there is formed thereon a projecting lug 19a upon which is pivoted a lever 34, by means of a pin 35 passing through a right angle extension 34a of the lever. The lever 34 is preferably stamped from sheet metal and has, at its end facing toward the member 19, a laterally bent flange 36. The valve member 30 has extending axially thereinto from its inner end a recess in which is positioned a strut 37. The inner end of this strut rests in a depression 38 formed in the flange 36 of the lever 34 and the strut is held in this position by the spring 32 tending to force the valve member inwardly away from its seat.

The valve member has adjacent its inner end a reduced portion 30b, and terminates in a part 30c of larger diameter. The flange 36 has a part 36a which arches over the part 30c of the valve member and terminates in a fork embracing the part 30b. In case the spring 32 should fail to function in urging the valve away from its seat, due to liquid congealing in the valve passage or for any other reason, the flange portion 36a will act against the valve part 30c to move the valve away from its seat in response to movement of the lever 34.

From the foregoing it will be seen that swinging of the lever 34 about its pivot 35 results in a movement of the valve member 30 toward or away from its seat, a counterclockwise swinging of the lever, as viewed in the drawing, effecting a closing of the valve, and a clockwise swinging of the lever 34 effecting opening of the valve. The valve member 30 is held in position by the spring 32 forcing the strut 37 against the lever and thus there is no play between the lever and the valve member, the slightest movement of the lever about its pivot effecting a corresponding movement of the valve.

Positioned against the outer side of the diaphragm 15 is a sheet metal plate 39. Bearing against the center of the inner side of the diaphragm is a smaller plate 40 which is preferably a flange formed integrally with a post 41 which projects into the fluid chamber 16. The post 41 has a threaded end portion 42 which passes through the diaphragm and through the plate 39, and threaded upon this part 42 is a nut 43 which clamps the plate 39 and the central portion of the diaphragm against the plate or flange 40. Projecting from the post 41 is a pin 44 which engages a slot 45 in the end of the lever 34.

The end of the threaded part 42 of the post 41 is rounded as shown at 42a and coacts with a rounded recess 46 in a lever 47. The lever 47 is positioned within the casing portion 11 and is pivoted, at its end remote from that engaging the member 42, upon a pin 48. The pivot pin 48 is supported upon a flange 49 adjacent to the side wall of the casing and adjacent to the edge of the diaphragm. The flange 49 is formed integrally with a cup-shaped member 50 which projects outwardly through an opening in the casing 11.

Within the cup-shaped part 50 is positioned a member 51 which has a threaded opening for the reception of a screw 52. The screw 52 passes through the outer end 50a of the cup-shaped part 50 and is provided exterior thereof with a locking nut 53. This screw 52 has preferably a pointed or rounded inner end 54 which engages the concave surface of a plate 55. Between the plate 55 and the lever 47 is positioned a spiral spring 56, the plate 55 having an annular concave portion 55a forming a seat for the outer end of the spring. Projecting from the lever 47 is a lug 57 over which the inner end of the spring is positioned and which holds the inner end of the spring in proper engagement with the lever.

The spring 56, acting upon the lever 47 adjacent to its pivot 48, swings the other end of the lever inwardly against the part 42, acting upon the diaphragm 15 in opposition to the pressure exerted thereon by fluid within the fluid chamber 16. By means of the adjusting screw 52, the spring 56 may be adjusted with accuracy.

Considering now the action of this apparatus, as fluid under pressure flows past the valve 30 and into the chamber 16, pressure builds up within the chamber and tends to move the diaphragm 15 outwardly. This action is opposed by the spring 56 acting through the lever 47. Any movement outwardly of the diaphragm is transmitted through the post 41, the pin 44 and the lever 34 to the valve member 30, moving the valve member toward closed position. If the pressure within the fluid chamber 16 tends to increase, the inlet passage past the valve member 30 at once starts to close to cut down the pressure. Also, if the pressure within the chamber 16 tends to decrease, the spring 56 moves the diaphragm 15 inwardly and this movement is transmitted to start to open the valve 30 and to restore the pressure. Thus the regulator is adapted to maintain constant the fluid pressure within the chamber 16 and hence the pressure of the fluid leaving the chamber through the exhaust passage in the bushing 21.

As has been pointed out above, the spring 56 acts against the lever 47 adjacent to the pivot of the lever. Thus, for a given movement of the spring, the diaphragm movement is much greater. Consequently, only a small expansion or contraction of the spring is required for movement of the valve 30 between closed position and its fully opened position. This small spring movement is a distinct advantage in insuring accurate operation of the regulator.

It has been mentioned above that the casing members 10 and 11 are preferably stamped from sheet metal and that the lever 34 is preferably of sheet metal. Preferably, also, the post 41, the lever 47 and the cup-shaped part 50 with its flange 49 are stamped from sheet metal. Thus, this construction is very simple and inexpensive to build. After the sheet metal parts have been stamped out they are easily assembled and the members 19 and 21 are readily secured in place, the member 19 being held in position by the nuts 25 and 26 as described, and the bushing 21 being fastened in its opening by soldering or welding. Preferably there is provided about the projecting cup-shaped part 50 a cap 58 to protect the adjusting screw 52. This cap 58 is preferably stamped from sheet metal and is held in place by a set screw 59 threaded through the cap and through a lug 60 secured to the outer surface thereof by soldering or welding. To the casing portion 10 are secured suitable brackets 61 by means of which the regulator may be mounted in position.

From the foregoing it will be seen that there is herein provided a construction which achieves the objects of this invention. The regulator is simple and inexpensive in construction and is capable of thoroughly dependable and highly accurate operation. The adjusting screw 52 is readily accessible and, by means of this screw, the regulator may be adjusted accurately to maintain the pressure which it is desired to establish in the chamber 16.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In a device of the class described, in combination, a casing having a diaphragm therein and forming on one side of the latter a fluid chamber, a valve for controlling the entrance of fluid to said chamber, and means connecting said valve to move in response to movements of said diaphragm, said means including a lever connected to said diaphragm and provided with a flange bent out of the plane of said lever for making connection with said valve.

2. In a device of the class described, in combination, a casing having a diaphragm therein and forming on one side of the latter a fluid chamber, a valve for controlling the entrance of fluid to said chamber, and means connecting said valve to move in response to movements of said diaphragm, said means including a lever connected to said diaphragm and provided with a flange bent back upon itself to form two spaced portions, said valve having means engaged between said spaced portions.

3. In a device of the class described, in combination, a casing having a diaphragm therein and forming on one side of the latter a fluid chamber, a valve for controlling the entrance of fluid to said chamber, means connecting said valve to move in response to movements of said diaphragm, said means including a lever stamped of sheet metal to provide a flange bent out of the plane of the lever, said flange having a portion bent substantially at an angle thereto, means associated with said valve adapted to engage said flange to move the valve when the lever is moved in one direction, and means associated with said valve adapted to engage said bent portion of the flange to move the valve when the lever moves in opposite direction.

4. In a device of the class described, in combination, a pressure chamber, a valve for controlling the entrance of fluid thereto, a diaphragm forming one wall of said chamber and movable in response to fluid pressure therein, means within said chamber connecting the inner side of said diaphragm and said valve to render the latter movable toward and away from its seat in response to movements of said diaphragm, a rounded projection extending from the outer side of said diaphragm adjacent the center thereof, a lever pivoted at one end adjacent the edge portion of said diaphragm and having adjacent the other end thereof a rounded recess engaging with said rounded projection, and a spring acting upon said lever tending to swing the same about its pivot and against said rounded projection to urge said diaphragm in opposition to the fluid pressure thereon.

5. In a device of the class described, in combination, a casing, a diaphragm extending through said casing and forming on one side thereof a fluid chamber, a valve for controlling the entrance of fluid to said chamber, means connecting said valve to move in response to movements of said diaphragm, a lever in said casing bearing against said diaphragm, a cup-shaped member extending through the wall of said casing and having at its inner end a part upon which said lever is pivoted, a spring acting upon said lever to urge the same against said diaphragm, said spring extending into said cup-shaped member, and an adjusting screw for said spring passing through the outer end of said cup-shaped member.

6. In a device of the class described, in combination, a casing having a diaphragm therein and forming on one side of the latter a fluid chamber, a valve for controlling the entrance of fluid to said chamber, means connecting said valve to move in response to movements of said diaphragm, said means including a bell crank lever having a long arm extending substantially in line with the direction of movement of said valve and a short arm extending substantially to one side of said valve, said lever having a flange bent substantially at right angles to the plane of the short arm thereof, and means connecting said flange to said valve.

In testimony whereof, I have signed my name to this specification this 31st day of August, 1927.

JOHN RUMPF.